(12) United States Patent
Siminoff

(10) Patent No.: US 8,925,407 B1
(45) Date of Patent: Jan. 6, 2015

(54) ADJUSTABLE PRESSURE ASSEMBLY FOR A ROTATING PLATE IN AN AUTOMOTIVE STEERING BOX

(76) Inventor: Roger Henry Siminoff, Atascadero, CA (US)

(*) Notice: Subject to any disclaimer, the term of this patent is extended or adjusted under 35 U.S.C. 154(b) by 387 days.

(21) Appl. No.: 13/308,457

(22) Filed: Nov. 30, 2011

(51) Int. Cl.
*F16H 27/02* (2006.01)

(52) U.S. Cl.
USPC ........................................ 74/89.14; 74/10.29

(58) Field of Classification Search
CPC ............. F16H 2055/281; F16H 19/04; F16H 2057/283; B62D 3/12; B62D 5/22
USPC ............ 74/89.11, 89.14, 388 PS, 10.5, 10.35, 74/10.31, 10.29, 10.85
See application file for complete search history.

(56) References Cited

U.S. PATENT DOCUMENTS

| | | | | |
|---|---|---|---|---|
| 2,865,216 A | * | 12/1958 | Bishop | 91/380 |
| 2,865,217 A | * | 12/1958 | Bishop | 91/380 |
| 3,359,866 A | * | 12/1967 | Folkerts | 91/375 A |
| 3,463,032 A | * | 8/1969 | Murphy, Jr. | 74/495 |
| 4,253,551 A | * | 3/1981 | Calabrese | 188/134 |
| 4,898,044 A | * | 2/1990 | Galloway | 74/424.6 |
| 5,590,562 A | * | 1/1997 | Scheck et al. | 74/89.14 |
| 5,743,670 A | * | 4/1998 | Ader | 403/296 |
| 6,003,395 A | * | 12/1999 | Rogg et al. | 74/335 |
| 6,147,435 A | * | 11/2000 | Fujimura | 310/317 |
| 6,308,587 B1 | * | 10/2001 | Shinkawa et al. | 74/89.25 |
| 7,237,449 B2 | * | 7/2007 | Kato | 74/425 |
| 8,118,328 B2 | * | 2/2012 | Uchihara et al. | 280/779 |

* cited by examiner

*Primary Examiner* — David M Fenstermacher
*Assistant Examiner* — Zakaria Elahmadi
(74) *Attorney, Agent, or Firm* — File-EE-Patents.com; Jay A. Chesavage

(57) ABSTRACT

An adjustable steering box has a worm gear with a worn region and a less-worn region, and the worm gear is engaged with pins on a rotating plate which is coupled to a steering mechanism. The rotating plate has an engagement position which is secured by an annular contact surface of an adjustable pressure assembly. The center of the annular contact surface has a pressure pin which protrudes and makes pressure contact with the rotating plate, thereby pressing the pins into engagement with the worm gear in worn regions with a pressure which compensates for play caused by worn regions of the worm gear or pins.

14 Claims, 1 Drawing Sheet

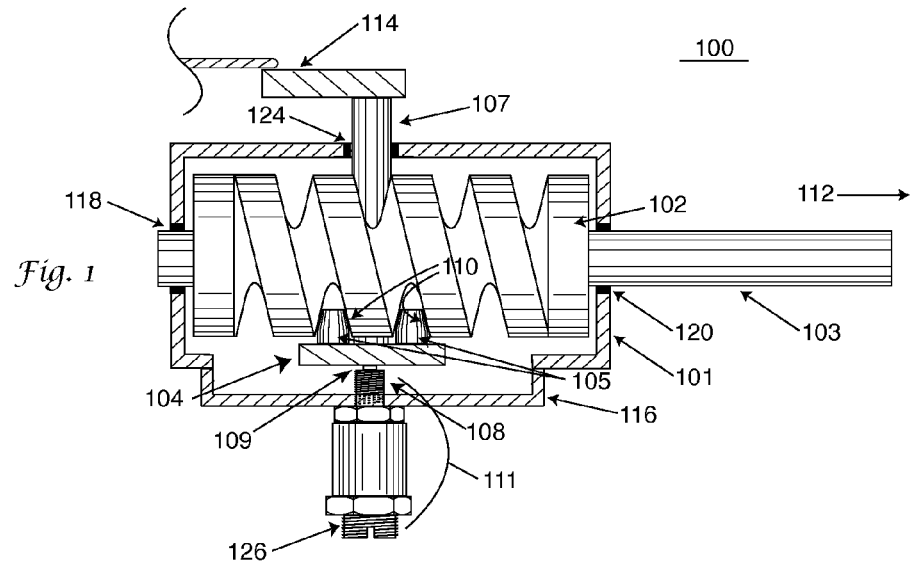
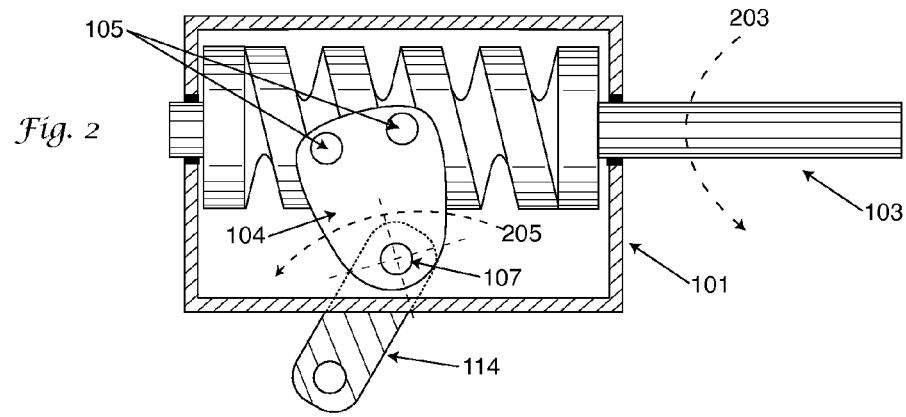
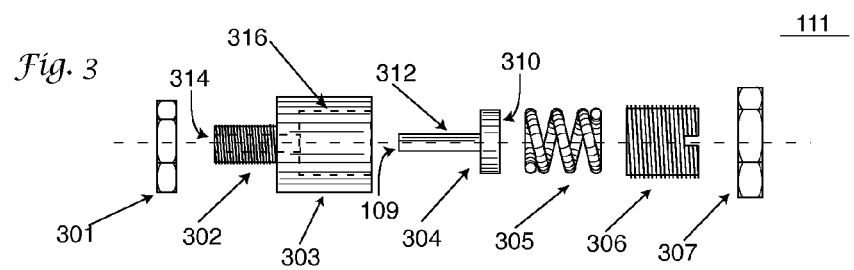
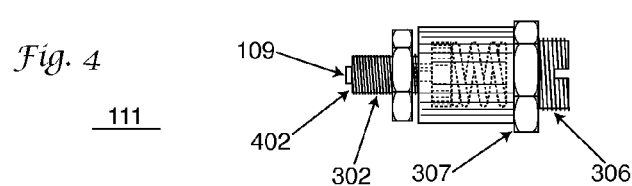

ADJUSTABLE PRESSURE ASSEMBLY FOR A ROTATING PLATE IN AN AUTOMOTIVE STEERING BOX

FIELD OF THE INVENTION

The present invention relates to an automotive worm gear steering box, which converts the rotation of a shaft coupled to a steering wheel into an angular displacement using a worm gear reduction, with the angular displacement coupled to a steering arm for control of the steering mechanism in an automobile. In particular, the invention relates to an adjustable force applied to a rotating plate having pins engaged with a worm gear having worn sections which would prevent positive engagement of the pins into the worm gear, where the pin would otherwise require a variety of position-dependant adjustments.

BACKGROUND OF THE INVENTION

An automotive steering box is typically located at the terminus of the steering wheel shaft, and converts the rotation of the steering wheel into the primarily linear movement of a steering arm, with the steering arm coupled to the steering components of the automobile. The steering components are typically attached to the front wheels of the vehicle, and the front wheels are coupled to suspension components. One example prior art steering box utilizes a worm gear coupled through one or more pins to drive a rotating plate with the worm gear providing gear reduction and the worm gear driven by a shaft coupled to the steering wheel. Such worm-gear steering systems were manufactured by the Ross Corporation and commonly used in Kaiser Willys, Studebaker, and similar early vehicles.

In one example device manufactured by the Ross Corporation, the rotating plate is coupled to the worm gear using two tapered pins which engage with the helically cut tooth of a worm gear. When the steering wheel is rotated, this rotation is coupled via universal joints to the steering box worm gear, which causes the pins to follow an arc trajectory described by the rotating plate axis and tapered pin engagement with the worm gear. One or two (or more) tapered pins may be attached to the rotating plate and engage with the worm gear. While some steering systems use one pin, two pins are typically used to distribute the load to the steering link, to enable a greater angular rotation control at the extremities of rotation when one pin reaches the end of engagement with the worm gear, and to reduce free movement or "play" in the steering system by distributing the wear to two pins, and provide for a redundant system for safety purposes.

Although steering systems are heavily lubricated with grease, significant wear occurs on the contact surfaces of the pins and worm gear, and as the tapered pins and worm gear wear, the free movement or "play" increases which introduces steering error and shimmy into the steering system, either of which can pose a hazardous condition for the vehicle, driver, and any passengers.

Additionally, wear is concentrated in areas of the worm gear where the pin surfaces are most frequently in wear contact with the worm gear, and less wear is associated with regions of the worm gear where the worm gear and pin engagement is less common. The worn regions of the worm gear and pins typically correspond to the rotational position of the worm gear associated with driving straight ahead, and the "unworn" regions of the worm gear reference the less frequently used regions, such as those corresponding with a turning position of the steering wheel. In the present description, "worn region" also refers to regions of the worm gear where the pin and worm gear surfaces which have increased play, and "unworn region" also refers to regions of the worm gear with less-worn regions than the worn regions, such as those associated with a turning position of the steering wheel. As the rotating plate, or steering link, coupled to the pins turns, the rotation of the steering link likewise rotates the tapered pins which causes different faces of the tapered pins to mate with the worm gear, but because the steering wheel is typically held in the straight-ahead position more often than it is held in the turning position, the "worn region" is found on the faces of the tapered pins and worm gear surfaces which contact each other in the straight-ahead steering position to a greater extent than the turning position of the steering wheel. If the conventional adjustment screw of a prior art steering box is tightened to reduce the play between the pins and worm gear by pressing the tapered pins further into engagement with the worm gear, the adjustment will reduce play produced by wear on the tapered pins at the worn regions, but introduce binding of the full turning of the worm gear when the non-worn faces of the tapered pins are rotated and come in contact with the unworn regions of the worm gear, which binding can contribute to or cause loss of steering control. Additionally, the conventional adjustment screw does not include provisions for failure protection, such as where the adjustment screw works loose from the steering box, in which event a very large level of pin movement perpendicular to the worm gear axis is possible.

It is desired to provide a worm gear steering box which eliminates play associated with region-specific wear patterns. It is also desired to provide an adjustment screw which provides sufficiently constant pressure on the pins engaged with the worm gear to maintain the engagement of the pins into the associated worm gear through its entire range of motion. It is also desired to provide an adjustment screw which minimizes the amount of displacement of the pins away from the worm gear in the event of a failure in the adjustment screw.

OBJECTS OF THE INVENTION

A first object of the invention is a steering box having a worm gear, a rotating plate coupled to a steering arm shaft, the rotating plate having two or more pins engaged with the worm gear, the rotating plate also having an adjustable pressure assembly having a pressure contact surface which is in contact with the rotating plate with the pressure applied on a surface opposite the surface which has the pins engaged with the worm gear, thereby ensuring complete engagement of the pins into the worm gear for all positions of the rotating plate and worm gear.

A second object of the invention is an adjustable pressure assembly providing pressure to a rotating plate, the rotating plate having pins engaged to a worm gear on one side of the rotating plate and an adjustable engagement pressure between the pins and the worm gear provided by the adjustable pressure assembly on an opposite side of the rotating plate, the adjustable engagement pressure provided by an adjustable pressure assembly which has an outer annular fixed surface for constraining the separation between the pins of the rotating plate and the worm gear, and a pressure pin providing force from a spring to the rotating plate.

A third object of the invention is an adjustable pressure assembly for a worm gear engaged to pins on a rotating plate, whereby uneven wear between the worm gear and the pins is compensated by a relatively constant pressure applied which positively engages the pins into the worm gear.

A fourth object of the invention is an adjustable pressure screw having:
- a cylindrical spring body having a male threaded region with a cylindrical aperture which allows a pressure pin shaft to transfer pressure through the spring body, the cylindrical spring body also having a comparatively larger diameter accommodating a cylindrical counterbore with female threads,
- a pressure pin having a shaft which passes through a cylindrical aperture in the threaded region of the cylindrical spring body, the pressure pin also having a spring pressure surface in contact with one end of a spring,
- the opposite end of the spring in contact with an adjustment screw threaded into the threads of the spring body female threaded counterbore.

SUMMARY OF THE INVENTION

A steering box 100 has a worm gear 102 engaged with pins 105 attached to a rotating plate 104. The rotating plate 104 is coupled to a steering arm shaft 107 such that as the worm gear 102 rotates, the pins 105 engaged to the worm gear cause the rotating plate 104 to rotate the steering arm shaft 107 axis, and the steering arm shaft 107 transfers this rotation as a linear movement to the steering mechanism of the vehicle which couples it to the front wheels of the vehicle. The mechanical engagement between the pins 105 and the worm gear 102 is provided by applying an adjustable pressure to the opposite side of the rotating plate 104 from the pins 105 engaged with the worm gear 102 in tapered region 110, thereby providing pressure between the pins 105 and worm gear 102 and reducing the mechanical clearances which result in steering play. The adjustable pressure assembly 111 includes a spring body 303 having a threaded region for transfer of pressure from a pressure pin 109 to the rotating plate 104. The spring body 303 also has a female threaded counterbore region 316 which encloses a shaft 312 of the pressure pin 304, which also has a spring pressure surface 310 in contact with a spring 305, the opposite end of the spring 305 in contact with an adjustment screw 306 which is threaded into the threaded counterbore region 316 of the spring body 303 and secured with a locknut 307. The spring body 303 has a male threaded region 302 with an annular front surface 402 which limits the movement of the rotating plate 104 away from the worm gear 102 to ensure continuous engagement between the pins 105 and worm gear 102, and the shaft 312 of pressure pin 109 has a contact region which provides constant pressure to the rotating plate 104 to ensure constant engagement between the pins 105 and worm gear 102 to compensate for increased clearances caused by region-specific wear of the worm gear and pins in the worn regions of the worm gear and pins associated with "straight ahead" position and unworn regions of the worm gear and pins associated with "turned" position.

BRIEF DESCRIPTION OF THE DRAWINGS

FIG. 1 shows a side cut-away view of a steering box according to the present invention.

FIG. 2 shows a top cut-away view of the steering box of FIG. 1.

FIG. 3 shows an exploded view of an adjustable steering box screw assembly.

FIG. 4 shows a side view of the assembled adjustable steering box screw assembly of FIG. 3.

DETAILED DESCRIPTION OF THE INVENTION

FIG. 1 shows a side cut-away top view of a steering box 100 according to the present invention, and FIG. 2 shows a cutaway side view in a plane generally perpendicular to the view of FIG. 1. Both figures should be examined together in view of the following description for complete understanding of the spatial positions of the elements of the invention. Steering box 100 includes an enclosure 101, and a cover plate 116 which provides access to the internal components of the system. A worm gear 102 with a worm gear shaft 103 rotates in the enclosure 101 with bearings or bushings 118 and 120, which allow worm gear 102 to turn freely about its axis. The worm gear shaft 103 is typically coupled to the vehicle steering wheel (not shown) in direction 112, and may also be coupled though one or more universal joints as required.

Steering arm shaft 107 is generally perpendicular to worm gear shaft 103, and shaft 107 is connected to rotating plate 104 which has pins 105 with profiled or tapered engagement surfaces 110 which match the threads, engagement groove, or profile of the worm gear 102 walls. Steering arm shaft 107 is constrained to rotate about its axis by bearings or bushings which are captured in enclosure 101, such as upper bearing 124 and a lower bearing which is not shown. As the worm gear 102 rotates, as by motion of the steering wheel, rotating plate 104 is driven by pins 105 and axially constrained by shaft 107, thereby causing shaft 107 to rotate in a gear reduction mode defined by the geometry of the pin 105 placement, steering arm shaft 107 placement, and worm gear 102 pitch. The rotating plate 104 thereby rotates about the steering arm shaft 107, and one end of the steering arm shaft 107 passes through a lubrication seal (not shown) near bushing 124 and is coupled to steering arm 114, which is connected to the steering components (not shown).

FIG. 2 shows the side cutaway view in a plane substantially perpendicular to the view of FIG. 1, and which includes worm gear shaft 103, steering arm shaft 107, pins 105 which are connected to the rotating plate 104, and steering arm 114 which is coupled to steering arm shaft 107 outside the extent of the steering box enclosure 101. Rotation 203 of worm gear shaft 103 results in angular displacement about the steering arm shaft 101 of rotating plate 104.

FIG. 1 also shows adjustable pressure assembly 111, which provides an adjustable level of constant pressure to be presented on the surface of rotating plate 104 on the surface opposite the pin 105 engagement, using pressure pin 109 preferably applying pressure to center of rotation of shaft 107, and the rotation about shaft 107 is shown as trajectory 205 of rotating plate 104 over its range of motion. Pressure pin 109 applies pressure to rotating plate 104 attached to shaft 107, and which pressure is adjustable using adjustment screw head 126 for setting the level of applied pressure. The pressure pin 109 end contact surface thereby drives the pins 105 into the worm gear 102 teeth with substantially constant and adjustable force. In this manner, the pins may travel over regions of the worm gear 102 with varying levels of wear while keeping the level of pressure on the pin 109 engagement substantially uniform, with the rotating plate 104 moving axially to the steering arm shaft 107 to compensate for wear. In this manner, steering box play in the pins 105 and worm gear 102 is eliminated. As the length of travel of pressure pin 109 from worn to unworn regions is less then 10% of the compressed spring extent, the force provided by the pressure pin is substantially constant.

FIG. 3 shows an exploded view of adjustable spring assembly 111. Spring body 303 includes a male threaded region 302 for engagement with jam nut 301, and for engagement with corresponding threads in enclosure 100 and cover plate 116. Spring body 303 has an interior cylindrical female threaded counterbore 316 and a smaller axial cylindrical aperture 314 which accommodates a shaft 312 part of the pressure pin 109 which has an end surface face which is in contact with rotating plate 104, preferably at the rotational center of shaft 107, which transfers the force from the pressure pin to the engagement surfaces of pins 105 and worm gear 102. Pressure pin 109 section of shaft 312 couples force from spring pressure surface 310 which is in contact with spring 305, which is held in place by threaded adjustment screw 306 which has threads which engage with matching threads of counterbore 316 and is secured with jam nut 307. Threaded region 302 forms a primary non-wear adjustment and adjustment screw 306 forms a secondary free play adjustment, as will be described. FIG. 4 shows the assembled adjustable spring assembly 111 of FIG. 3.

The steering system of the present invention may be used in worm gear drive steering boxes such as a Willys Jeep or vehicles with similar steering boxes. The present invention provides for two steering box adjustments. A comparatively less worn region such as the "turned position" region of the worm gear 102 and pin face 110 is located, and a first (primary non-wear) adjustment is performed when the face 402 of threaded region 302 of the adjustable spring assembly 111 directly contacts rotating plate 104 to force the non-worn faces 110 of the tapered pins 105 to be in contact with the worm gear 102, after which jam nut 301 is tightened against the steering box to secure the non-wear adjustment position of assembly 111. After the surface 402 provides direct rotating plate contact in the unworn section, the worm gear is turned to a worn section (such as the "straight ahead" region previously described) and the pressure pin 109 eliminates play in the worn region. Should more pressure be required, a second adjustment can be performed using adjustment screw 306. Adjustment screw 306 provides control of spring force applied by pressure pin 109, which forces the worn faces of the tapered pins 105 to be in pressure contact with the worm gear. Adjustment of the pressure applied to plunger 304 via spring 305 is accomplished by tightening or loosening the secondary adjustment screw 306 and then securing it with jam nut 307. It is a further feature of the invention that should pressure pin 304 or spring 305 fail, steering link 104 could only back out as far as face 402 of the threaded adjustment shaft 109 before rotating plate 104 is stopped for further withdrawal by threaded region 302.

I claim:

1. A steering box having:
    an enclosure;
    a worm gear with threads formed therein and having an axis of rotation and coupled to a control shaft, said worm gear capable of rotating about said worm gear axis in said enclosure;
    a rotating plate coupled to a steering arm shaft, said steering arm shaft substantially perpendicular to said worm gear axis and able to rotate in said enclosure, said rotating plate having a substantially planar pressure surface opposite a pin surface which includes at least one tapered pin which engages with said worm gear threads, said worm gear threads having a worn region in a central extent whereby, for a given tapered pin engagement depth, said tapered pin has greater clearance to said worm gear in said worn central extent than in a comparatively less worn region on either end from said central extent;
    an adjustable pressure assembly having a substantially non-deformable outer annular contact surface for contacting said substantially planar pressure surface of said rotating plate pressure surface when said tapered pin is engaged with said worm gear in said unworn region, said adjustable pressure assembly also having an inner pressure pin protruding through said annular contact surface and providing pressure to said rotating plate when said tapered pin is engaged with said worm gear in said worn region of said worm gear threads;
    where said non-deformable outer annular contact surface maintains an interference clearance from said tapered pin to said worm gear in an unworn region, and said pressure pin contacts said rotating plate pressure surface in said worn regions, thereby increasing a tapered pin engagement depth and thereby reducing a clearance between said tapered pin and said worm gear in said worn regions.

2. The steering box of claim 1 where said adjustable pressure assembly includes a spring body having a threaded region for engagement with matching threads in said enclosure.

3. The steering box of claim 1 where said adjustable pressure assembly includes a spring body which encloses, in sequence, said pressure pin having a spring pressure surface on one end and a shaft on an opposite end which protrudes through said annular contact region, thereby forming said pressure pin, a spring which provides a force delivered to said rotating plate pressure surface, and an adjustment screw secured to said spring body for adjusting said force.

4. The steering box of claim 1 where said steering arm shaft includes a steering arm for coupling to a steering mechanism.

5. The steering box of claim 1 where said adjustable pressure assembly comprises:
    a spring body having a male threaded region and a counterbore with a female threaded region, said male threaded region including an aperture forming said annular contact surface;
    said pressure pin having a shaft which passes through said aperture, said pressure pin also having a spring pressure surface;
    a spring providing a pressure to said spring pressure surface on one end and in contact with an adjustment screw on an opposite end;
    said adjustment screw threaded into said spring body female threaded counterbore region.

6. The steering box of claim 5 where a locknut is provided on at least said male threaded region of said spring body or on said adjustment screw.

7. The steering box of claim 1 where said worm gear worn region corresponds to a non-turning steering position of said rotating plate and said unworn region corresponds to a turning steering position of said rotating plate.

8. The steering box of claim 7 where said worn region is over a central extent of said worm gear and said unworn region is over at least one region adjacent to said central extent.

9. The steering box of claim 5 where said male threaded region is engaged with said steering box enclosure to provide contact between said annular contact surface and said rotating plate in said unworn region, and said adjustment screw is set to provide sufficient pressure to provide engagement between said tapered pins and said worm gear in said worn region of said worm gear.

10. A steering box having:
    an enclosure;
    a worm gear having an engagement groove and rotating about an axis in said enclosure, said worm gear having a central worn region where said engagement groove is wider compared to the width of the engagement groove in unworn regions which are on either side of said central worn region;

a rotating plate with at least one pin engaged into said worm gear engagement groove, said rotating plate having a substantially planar pressure surface opposite said at least one pin, said rotating plate coupled to a steering arm shaft which rotates on an axis substantially perpendicular to said worm gear axis, said at least one pin having greater clearance with said engagement groove in said worn regions compared to said unworn regions for a given pin depth of engagement with said engagement groove;

an adjustable pressure assembly having an substantially non-deformable annular surface which is in contact with said substantially planar pressure surface of said rotating plate when said at least one pin is in said unworn regions of said engagement groove, said adjustable pressure assembly also having a pressure pin extending through said annular surface, said pressure pin coupling pressure from a spring onto said rotating plate onto said substantially planar pressure surface of said rotating plate, thereby reducing the clearance between said at least one pin and said worm gear in said worn regions of said engagement groove.

11. The steering box of claim 10 where said adjustable pressure assembly includes a body with threads engaged into said enclosure, and said body also includes threads engaged with an adjustment screw which sets the pressure from said spring.

12. The steering box of claim 10 where said adjustable pressure assembly includes:

a body having a first threaded end for engagement into matching threads of said enclosure and a second threaded end for engagement with an adjustment screw, said first threaded end also having an aperture forming said annular surface;

said pressure pin having a shaft which passes through said aperture, said pressure pin also having a spring pressure surface;

said spring in contact with said spring pressure surface of said pressure pin;

said adjustment screw in contact with the opposite end of said spring.

13. The steering box of claim 12 where said adjustable pressure assembly first threaded end is engaged into threads of said enclosure until said first threaded end is in contact with said rotating plate when said at least one pin is engaged in an unworn region of said worm gear.

14. The steering box of claim 12 where said adjustable pressure assembly adjustment screw is adjusted to provide a pressure sufficient to reduce the clearance between said at least one pin and said worm gear in a worn region of said worm gear.

* * * * *